United States Patent
Gao et al.

(10) Patent No.: US 10,078,450 B2
(45) Date of Patent: Sep. 18, 2018

(54) HANDLING MOVEMENT OF A PHYSICAL DRIVE

(71) Applicant: EMC Corporation, Hopkinton, MA (US)

(72) Inventors: Jian Gao, Beijing (CN); Hongpo Gao, Beijing (CN); Xinlei Xu, Beijing (CN); Jibing Dong, Beijing (CN); Geng Han, Beijing (CN)

(73) Assignee: EMC Ip Holding Company, Hopkinton, MA (US)

( * ) Notice: Subject to any disclaimer, the term of this patent is extended or adjusted under 35 U.S.C. 154(b) by 43 days.

(21) Appl. No.: 15/180,406

(22) Filed: Jun. 13, 2016

(65) Prior Publication Data

US 2016/0378345 A1   Dec. 29, 2016

(30) Foreign Application Priority Data

Jun. 26, 2015   (CN) .......................... 2015 1 0363535

(51) Int. Cl.
*G06F 3/06* (2006.01)
*G06F 12/00* (2006.01)

(52) U.S. Cl.
CPC .......... *G06F 3/0607* (2013.01); *G06F 3/0617* (2013.01); *G06F 3/0647* (2013.01); *G06F 3/0689* (2013.01)

(58) Field of Classification Search
None
See application file for complete search history.

(56) References Cited

U.S. PATENT DOCUMENTS

2004/0073742 A1\*   4/2004   Arimilli .............. G06F 12/0292
                                                                        711/5

\* cited by examiner

*Primary Examiner* — John A Lane
(74) *Attorney, Agent, or Firm* — Krishnendu Gupta; Konrad R. Lee

(57) ABSTRACT

Embodiments of the present disclosure provide a method and apparatus for handling the movement of a physical drive by generating a provision drive for a physical drive that is moved; establishing a connection from the provision drive to the physical drive; and updating the provision drive via the connection according to location information of the physical drive.

20 Claims, 4 Drawing Sheets

HANDLING MOVEMENT OF A PHYSICAL DRIVE

RELATED APPLICATION

This application claim priority from Chinese Patent Application Number CN201510363535.X, filed on Jun. 26, 2015 at the State Intellectual Property Office, China, titled "METHOD AND APPARATUS FOR HANDLING MOVEMENT OF PHYSICAL DRIVE," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD OF INVENTION

Embodiments of the present disclosure relates to the field of storage devices.

BACKGROUND

Prior to the release of storage device VNX2, EMC²® (hereinafter EMC²) released VNX, AX/CX block storage products. However, block storage products, such as VNX, AX/CX may not support a scenario that a user drive or a system drive is moved, that is, those products require all drives to be fixed in their respective drive slots, and the replacement of a drive with a new drive is only allowed when a drive malfunctions or gets damaged.

In EMC² VNX2 array, a physical drive in the storage system may no longer be required to be bound with a particular slot. Therefore, "a portable drive" may become a features of VNX2 array. In other words, physical drives with bound logical unit numbers (LUNs) and disk groups (Raid groups) (the Raid groups mainly provide data re-establishing, verification and Raid algorithms) may be moved to different slots in a storage system, and meanwhile these drives may still be recognized as those LUNs and Raid groups. The drives and Raid groups/LUNs would keep available during or after a drive movement. Since VNX2 makes movement of physical drives possible, movement of a physical drive should also be transparent to the Raid group when a physical drive is moved to another slot.

SUMMARY

Embodiments of the present disclosure provide a method and apparatus of handling and managing movement of VNX2 physical drive generating a provision drive for a physical drive that is moved; establishing a connection from the provision drive to the physical drive; and updating the provision drive via the connection according to the location information of the physical drive.

BRIEF DESCRIPTION OF DRAWINGS

The figures described here are used to provide further understanding to the present disclosure and constitute a portion of the present application. Exemplary embodiments of the present disclosure and depictions thereof are used to illustrate the present disclosure and do not constitute improper limitation of the present disclosure.

DETAILED DESCRIPTION

Figure 1:
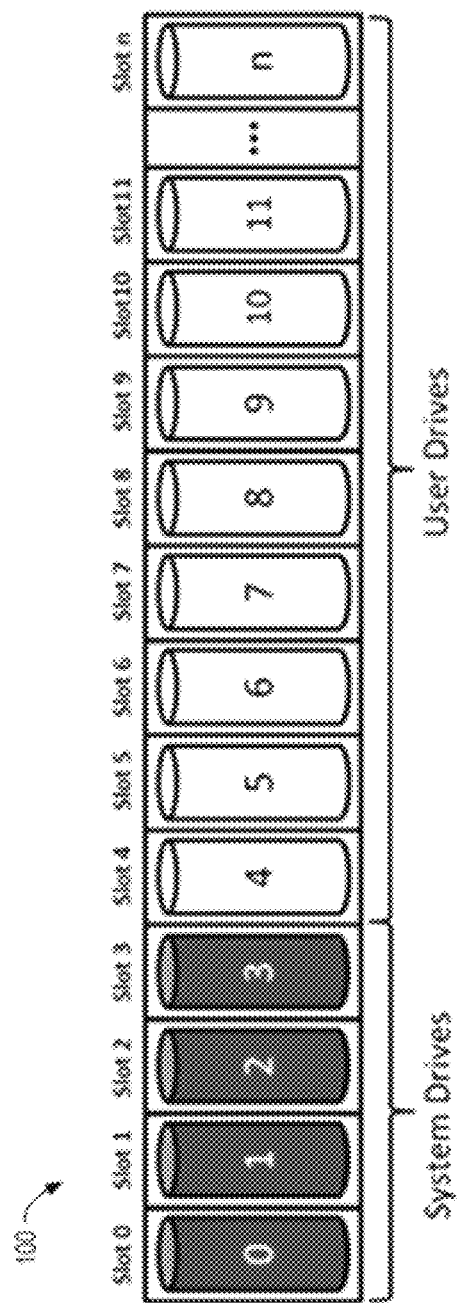
FIG. 1 is a schematic view of a physical drive array according to an exemplary embodiment of the present disclosure.

Principles of the present disclosure are described with reference to several exemplary embodiments shown in the figures. Although figures show preferred embodiments of the present disclosure, it should be appreciated that these embodiments are described only to enable those skilled in the art to better understand and implement the present disclosure, and not intended to limit the scope of the present disclosure in any manner.

Embodiments of the present disclosure provide a method and apparatus of handling and managing movement of VNX2 physical drive. A further embodiment may include generating a provision drive for a physical drive that is moved. A further embodiment may include establishing a connection from a provision drive to a physical drive. A further embodiment may include updating a provision drive via a connection according to location information of a physical drive.

In a further embodiment, a concept of a virtual memory (provision drive) may be introduced as a solution. In a further embodiment, a virtual memory may be connected with physical drives, and a virtualization layer may be provided between a real hard disk and a Raid group. In a further embodiment, as a virtualized drive object, a virtual memory may provide transparency of drive movement to a Raid group. In a further embodiment, specifically, if a physical drive is moved from one slot to another, provision drive may disconnect an original connection to a physical drive and reconnect the physical drive to another slot after the physical drive is moved. In a further embodiment, provision drive may maintain location information of a physical drive and a connection to a physical drive.

Various embodiments of the present disclosure describe how the provision drive may deal with a drive movement and provides a transparency to a Raid group. Embodiment of the present disclosure also defines a method (or policy) for managing a physical drive for various different types of drives.

In one embodiment, a method of handling physical drive movement may include generating a provision drive for a physical drive that is moved. A further embodiment may include establishing a connection from a provision drive to a physical drive. A further embodiment may include updating a provision drive via a connection according to location information of a physical drive. In a further embodiment, a provision drive may be a virtualization layer located between a physical drive and a disk group and configured to record information of a connected physical drive. In a further embodiment, information of a physical drive may include serial number of a physical drive and location information of a physical drive. In a further embodiment, a slot where a physical drive is located may be categorized into a system slot and a user slot according to a location of a physical drive.

According to a further embodiment, a physical drive may include at least one of the following: a new drive containing no data; a user drive, including a bound user drive containing user data or an unbound user drive containing no user data; and a system drive containing configuration and metadata of an array to which a system drive belongs. According to a further embodiment, a user drive may be categorized into a user drive of a current array and a user drive of a further array. According to a further embodiment, a system drive may be categorized into a system drive of a current array and a system drive of a further array.

According to a one embodiment, generating a provision drive for a physical drive that is moved may include generating a provision drive in response to a user drive being moved to any slot of a current array. A further embodiment may alternatively include generating a provision drive in response to a system drive of a current array being moved to an original system slot of a system drive. According to a further embodiment, generating a provision drive in response to a user drive being moved to any slot of a current array may include, in response to a user drive of the current array being moved to any slot of a current array, using an existing user provision drive.

According to a further embodiment, generating a provision drive in response to a user drive being moved to any slot of a current array may include, in response to a new drive and/or a user drive of a further array being moved to a user slot of a current array, creating a new user provision drive. According to a further embodiment, generating provision drive in response to a user drive being moved to any slot of a current array may include, in response to a new drive and/or a user drive of a further array being moved to a system slot of a current array, re-initializing a system provision drive corresponding to a system slot. According to a further embodiment, generating a provision drive in response to a user drive being moved to any slot of a current array may include, in response to an unbound user drive of a current array being moved to a system slot of a current array, reclaiming an original user provision drive and re-initializing a system provision drive corresponding to a system slot.

According to a further embodiment, establishing a connection from a provision drive to a physical drive may include, establishing a connection of a new drive, a connection of a user drive and a connection of a system drive to a corresponding user provision drive or system provision drive. According to a further embodiment, establishing a connection from a provision drive to a physical drive may include, establishing a connection from a provision drive to a physical drive based on a match of a serial number recorded on a provision drive and a serial number recorded on a physical drive.

One embodiment provides an apparatus of handling physical drive movement. A further embodiment may include a generating unit that may be configured to generate a provision drive for a physical drive that is moved. A further embodiment may include a connection establishing unit that may be configured to establish a connection from a provision drive to a physical drive. A further embodiment may include an updating unit that may be configured to update a provision drive via a connection according to a location information of a physical drive. According to an embodiment, a provision drive may be a virtualization layer located between a physical drive and a disk group and may be configured to record information of a connected physical drive.

According to a further embodiment, information of a physical drive may include serial number of a physical drive and location information of a physical drive. According to a further embodiment, a slot at which a physical drive is located may be categorized into a system slot and a user slot according to a location of a physical drive.

According to a further embodiment, a physical drive may include at least one of the following: a new drive containing no data; a user drive, including a bound user drive containing user data or an unbound user drive containing no user data; and a system drive containing configuration and metadata of an array to which a system drive belongs. According to a further embodiment, a user drive may be categorized into a user drive of a current array and a user drive of a further array. According to a further embodiment a system drive may be categorized into a system drive of a current array and a system drive of a further array.

According to a further embodiment, a generating unit may be configured to generate a provision drive in response to a user drive being moved to any slot of a current array. According to an alternate embodiment, a generating unit may be configured to generate a provision drive in response to a system drive of a current array being moved to an original system slot of a system drive. According to a further embodiment, a generating unit may be configured to use an existing user provision drive in response to a user drive of a current array being moved to any slot of a current array. According to a further embodiment, a generating unit may be configured to create a new user provision drive in response to a new drive and/or a user drive of a further array being moved to a user slot of a current array. According to a further embodiment, a generating unit may be configured to re-initialize a system provision drive corresponding to a system slot in response to a new drive and/or a user drive of a further array being moved to a system slot of the current array. According to a further embodiment, a generating unit may be configured to reclaim an original user provision drive and re-initialize a system provision drive corresponding to a system slot in response to an unbound user drive of a current array being moved to the system slot of a current array.

According to a further embodiment, a generating unit further may include a creating unit that may be configured to create a new user provision drive. According to a further embodiment, a generating unit further may include a reclaiming unit that may be configured to reclaim an original user provision drive. According to a further embodiment, a generating unit further may include a resetting unit that may be configured to re-initialize a system provision drive.

According to a further embodiment, a connection establishing unit may include a connecting establishing sub-unit that may be configured to respectively establish a connection of a new drive, a connection of a user drive and a connection of a system drive to a corresponding user provision drive or system provision drive. According to a further embodiment, a connection establishing unit may further include a serial number matching unit that may be configured to create a connection from a provision drive to a physical drive based on a match of a serial number recorded on a provision drive and a serial number recorded on the physical drive.

A further embodiment may include a computer program product for handling physical drive movement, the computer program product being tangibly stored in a non-transitory computer-readable medium and comprising a machine-executable instruction, wherein the machine-executable instruction being executed to enable a machine to execute the method disclosed above.

Reference is now made to FIG. 1, which is a schematic view of a physical drive array according to an exemplary embodiment of the present disclosure. As shown in FIG. 1, an array of the present disclosure comprises a plurality of physical drives, and a plurality of slots (namely, slot 0, . . . slot 4, . . . slot n) respectively corresponding to each physical drive. Each physical drive can form an electrical connection with a slot for data and power transmission. The physical drive array shown in FIG. 1 comprises system drives (namely, drive 0 to drive 3) and user drives (namely, drive 4 to drive n). Correspondingly, FIG. 1 also shows system slots (namely, slot 0 to slot 3) and user slots (namely, slot 4 to slot n). It should be appreciated that the "drive" in the context as disclosed herein is not intended to limit the type of the storage unit to be a certain specific type, and any device that is capable of storing data should be covered under the scope of "drive" of the present disclosure, for example, hard disk drives and solid-state drives.

Figure 2:
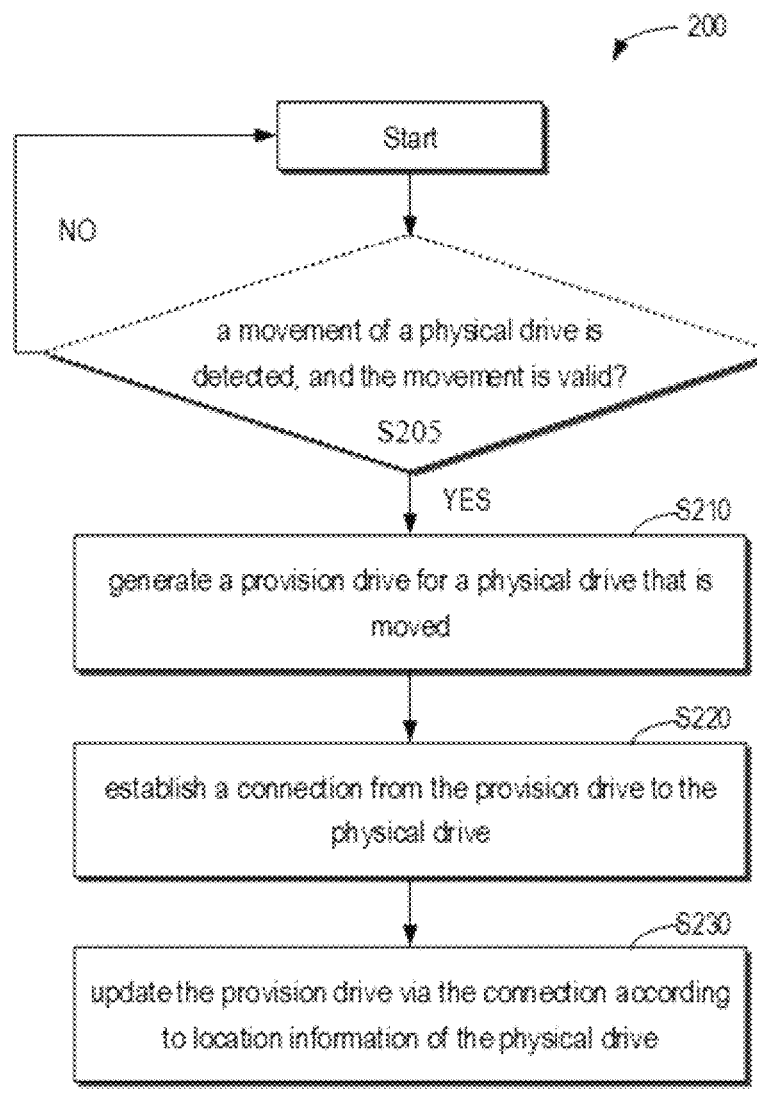
FIG. 2 is a flow chart of a method 200 for handling physical drive movement according to an exemplary embodiment of the present disclosure.

Reference is now made to FIG. 2, which is a flow chart of a method 200 for handling physical drive movement according to an embodiment of the present disclosure. In Step S205, it is first determined whether there is a movement of a physical drive and if the movement of the physical drive is valid. If the movement is valid, method 200 moves to S210. Step S210 comprises generating a provision drive for a physical drive that is moved. Step S220 comprises establishing a connection from the provision drive to the physical drive. And step S230 comprises updating the provision drive via the connection according to location information of the physical drive.

Figure 3:
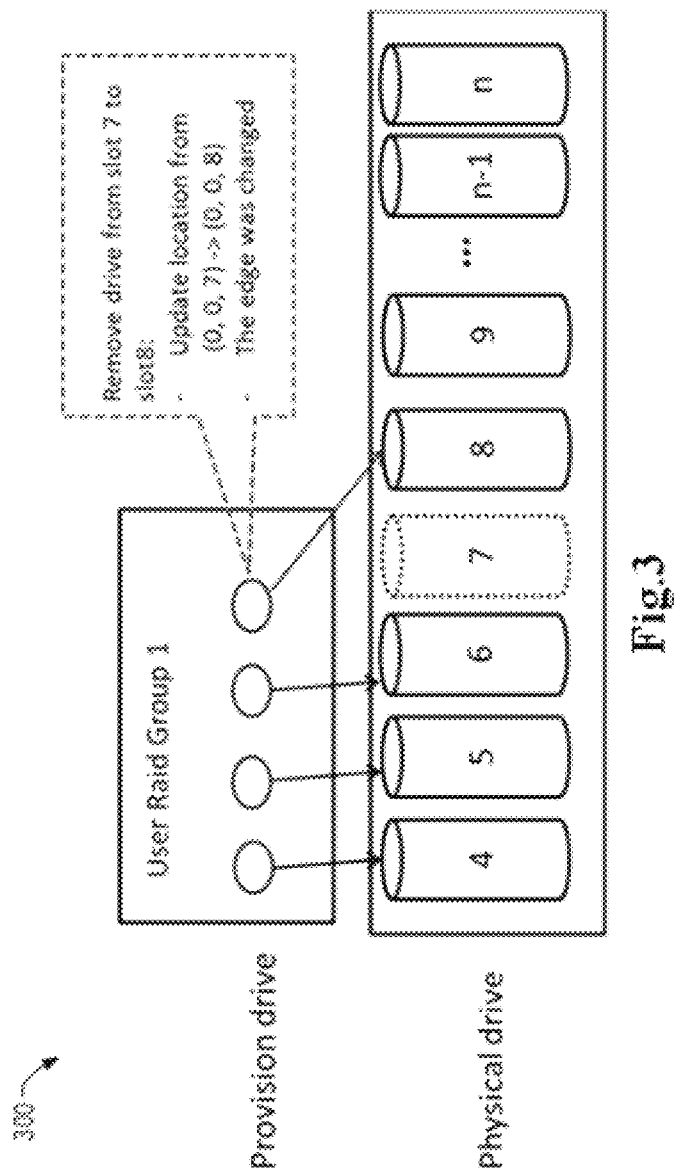
FIG. 3 is a schematic view showing physical drive movement according to an exemplary embodiment of the present disclosure.

Reference is now made to FIG. 3, which is a schematic view showing physical drive movement according to an embodiment of the present disclosure. In particular, FIG. 3 shows a scenario that a physical drive has been moved from slot 7 to slot 8. As shown in FIG. 3, a provision drive is a virtualization layer located between a physical drive and a Raid group and configured to record information of the connected physical drive. As shown in FIG. 3, the location information of the physical drive is represented in a form of <0, 0, 7> and <0, 0, 8>, respectively indicating that the physical drive is successively located in slot 7 and slot 8. It should be appreciated that the present disclosure is not intended to limit the specific format or form of the location information, and any format or form of the location information that may indicate the location of the physical drive falls within the protection scope of the present disclosure. Further, it should be mentioned that referring to the physical drive array in FIG. 1, the specific embodiment in FIG. 3 only shows a part of user slots (namely, slot 4 to slot n) and a part of user drives (namely, drive 4 to drive n) located on their respective user slots.

According to an embodiment, information of a physical drive may include a serial number of a physical drive and location information of a physical drive. According to a further embodiment, serial number of a physical drive may be a globally unique identification of a physical drive and may be allocated by drive manufacturers, such as, Seagate, Hitachi etc. According to another embodiment, a slot at which a physical drive is located may be categorized into a system slot and a user slot according to a location of the physical drive. According to a further embodiment, a physical drive may include at least one of the following: a new drive containing no data; a user drive, including a bound user drive containing user data or an unbound user drive containing no user data; and a system drive containing configuration and metadata of an array to which a system drive belongs. According to a further embodiment, a user drive may be categorized into a user drive of a current array and a user drive of a further array. According to a further embodiment a system drive may be categorized into a system drive of a current array and a system drive of a further array.

According to a further embodiment, step S210 (reference being made to FIG. 2) may include generating a provision drive in response to a user drive being moved to any slot of the current array. According to an alternate embodiment, step S210 may include generating a provision drive in response to a system drive of current array being moved to an original system slot of a system drive. According to a further embodiment, step S210 may be only executed on a premise that movement of a physical drive is determined as a valid movement. According to a further embodiment, a valid movement of a physical drive includes two scenarios: (a) a user drive being moved to any slot of a current array, or (b) a system drive of a current array being moved to an original system slot of a system drive, or scenario (b) may be interpreted as a system drive is moved away from its original system slot and then is placed back into a same original system slot.

According to a more specific embodiment, the step of generating a provision drive based on the above-mentioned valid movement (a) in step S210 (namely, generating the provision drive in response to a user drive being moved to any slot of the current array) may be depicted as the following four more specific scenarios, including:

Scenario 1: in response to a user drive of current array being moved to any slot of a current array, using an existing user provision drive.

Scenario 2: in response to a new drive and/or a user drive of a further array being moved to a user slot of a current array, creating a new user provision drive.

Scenario 3: in response to a new drive and/or a user drive of a further array being moved to a system slot of a current array, re-initializing a system provision drive corresponding to a system slot.

Scenario 4: in response to an unbound user drive of a current array being moved to a system slot of the current array, reclaiming an original user provision drive and re-initializing a system provision drive corresponding to a system slot. In the text below, types of the valid movement of various physical drives will be described in more detail.

According to an embodiment, it should be noted that in the case that a movement of a physical drive is determined as an invalid movement (i.e., all other scenarios than the valid scenarios), step S210 and subsequent step S220 and S230 will not be executed. According to a further embodiment, invalid scenarios of movement of a physical drive may be mostly those scenarios involving a system drive that is moved. According to a further embodiment, this may be because a system drive must contain configuration and metadata of a drive array, which may be the most important and crucial information in any drive array. According to a further embodiment, once information gets lost, all user data in an array to which a system drive belongs will be lost. According to a further embodiment, on purpose of protecting user data, movement of a system drive may not be allowed in most scenarios.

According to a further embodiment, invalid movements of a physical drive include:
(a) a system drive may be moved to a user slot; or
(b) a system drive may be moved to another system slot which may be different from the original one.

According to some embodiments, types of invalid movement of various physical drives will be described in more detail. According to a further embodiment, step S220 may include creating a connection of a new drive, a connection of a user drive and a connection of a system drive to a corresponding user provision drive or system provision drive. According to a further embodiment, creating a connection of a provision drive to a physical drive may include creating a connection from a provision drive to a physical drive based on a match of a serial number recorded on a provision drive with a serial number recorded on a physical drive.

According to a further embodiment, as already mentioned above, there may be different types of slots and various types of physical drives in the drive array. According to a further embodiment, following Table 1 lists all possible movements of a physical drive based on various types of movements of slot and drive:

TABLE 1

| No | Drive movement type |
|---|---|
| 1 | a new drive to a user slot |
| 2 | a new drive to a system slot |
| 3 | a user drive of a further array to a user slot |
| 4 | a user drive of a further array to a system slot |
| 5 | an unbound user of a current array drive to its original slot |
| 6 | an unbound user drive of a current array to another user slot |
| 7 | an unbound user drive of a current array to a system slot |
| 8 | a bound user drive of a current array to its original slot |
| 9 | a bound user drive of a current array to another user slot |
| 10 | a bound user drive of a current array to a system slot |
| 11 | a system drive of a further array to a user slot |
| 12 | a system drive of a further array to a system slot |
| 13 | a system drive of a current array to its original slot |
| 14 | a system drive of a current array to another system slot |
| 15 | a system drive of a current array to a user slot |

According to a further embodiment, Table 2 lists management policies of physical drive movement, namely, generating policies of provision drive, based on various possible physical drive movements in Table 1.

TABLE 2

| Physical drive movement type | provision drive generating and connecting policies |
|---|---|
| 1 | Create a new user provision drive, and connect it to physical drive. |
| 2 | Reinitialize system provision drive corresponding to a system slot in which a drive gets moved (the system provision drive would not be reclaimed, so no system provision drive re-creation, just re-initialization). Connect a system provision drive to physical drive. |
| 3 | Create a new user provision drive. Connect it to physical drive. |
| 4 | Reinitialize system provision drive corresponding to a system slot in which a drive gets moved. Connect a system provision drive to physical drive. |
| 5 | Connect existing matched user provision drive to a physical drive |
| 6 | Connect existing matched user provision drive to a physical drive |
| 7 | Reclaim a user provision drive which connected to a drive originally. Reinitialize system provision drive corresponding to a system slot in which a drive gets moved. Connect a system provision drive to a physical drive. |
| 8 | Connect existing matched user provision drive to physical drive. |
| 9 | Connect existing matched user provision drive to physical drive. |
| 10 | Neither reinitializes any system provision drive, nor connects it to any user provision drive. Send an event to tell a user that there is a bound user drive has been inserted into system slot incorrectly. |
| 11 | Do not create user provision drive for it. Send an event to tell a user that there is a foreign array system drive has been inserted into user slot incorrectly. |
| 12 | Do not reinitialize any system provision drive for it. Send an event to tell a user that there is a foreign array system drive has been inserted into system slot incorrectly. |
| 13 | Connect existing matched system provision drive to a physical drive. |
| 14 | Neither reinitializes any system provision drive, nor connects it to original system provision drive. Send an event to tell a user that a system drive was inserted into another system slot incorrectly. |
| 15 | Neither create a user provision drive for it nor connect it to original system provision drive. Send an event to tell a user that a system drive was inserted into user slot incorrectly. |

It can be seen in combination with above various embodiments as well as Table 1 and Table 2, that valid movements of a physical drive include: physical drive movement types 1-9 and 13; and invalid movements of a physical drive include physical drive movement types 10-12 and 14-15.

According to a further embodiment, the following may be observed from various embodiments disclosed above:
1. If a bound user drive is inserted in a system slot (namely, movement type 10), a system provision drive is neither reinitialized, nor connected to any user provision drive, because there is user data existing in the bound user drive.
2. Movement of a physical drive from a system slot to a user slot may not be allowed, because there are important array configuration data and metadata stored on the system drive, and furthermore, the array's configuration data and metadata cannot be lost.
3. When a physical drive movement is determined as an invalid movement, notification message may be sent to inform a user that a system drive is inserted incorrectly, and this can be recovered by the user by moving the physical drive to a correct slot.
4. For user drive of a further array, it may be allowed to destroy data stored in the user drive of the further array because it is impossible to know other array's configuration and metadata, and thereby it becomes impossible to know whether there is data existing on the user drive of the further array, and furthermore, as compared to the case in which a physical drive is being moved nearby a drive array to which it originally belongs (i.e., the physical drive is being moved around the same array), such physical drive movement coming from other arrays may be more likely in purpose.

To conclude, by using the method and policy described in various embodiment disclosed above, it may be ensured that whilst a physical drive is allowed to move, no data loss may occur during the physical drive movement.

Figure 4:
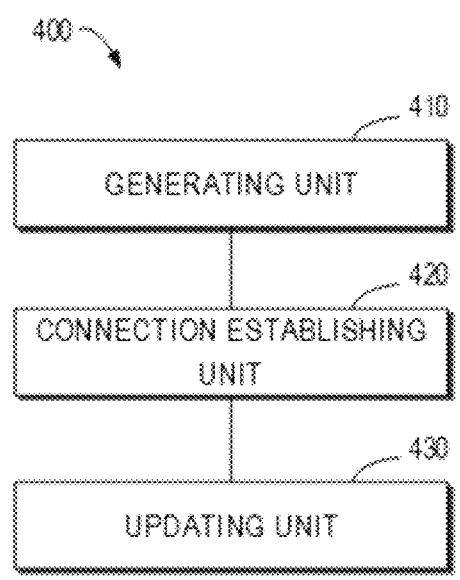
FIG. 4 is a block diagram of an apparatus 400 for handling physical drive movement according to an exemplary embodiment of the present disclosure.

Reference is now made to FIG. 4, which is a block diagram of an apparatus 400 for handling physical drive movement according to an exemplary embodiment of the present disclosure. The apparatus comprises: a generating unit 410 configured to generate a provision drive for a physical drive that is moved; a connection establishing unit 420 configured to establish a connection from the provision drive to the physical drive; and an updating unit 430 configured to update the provision drive via the connection according to the location information of the physical drive.

According to an embodiment, and referring to FIG. 3, a provision drive may be a virtualization layer located between a physical drive and a disk group and configured to record information of a connected physical drive. According to another embodiment, and referring to FIG. 3, information of a physical drive may include: serial number of a physical drive and location information of a physical drive. According to a further embodiment, and referring to FIG. 3, a slot at which a physical drive is located may be categorized into a system slot and a user slot according to a location of a physical drive.

According to a further embodiment, a physical drive may include at least one of the following: a new drive containing no data; a user drive, including a bound user drive containing user data or an unbound user drive including no user data; and a system drive containing configuration and metadata of an array to which a system drive belongs. According to a further embodiment, a user drive may be categorized into a user drive of a current array and a user drive of a further array. According to a further embodiment, a system drive may be categorized into a system drive of a current arrays and a system drive of a further array.

According to a further embodiment, generating unit 410 may be configured to generate a provision drive in response to a user drive being moved to any slot of a current array; or generate a provision drive in response to a system drive of current array being moved to an original system slot of a system drive. According to a further embodiment, generating unit 410 may be configured to use an existing user provision drive in response to a user drive of the current array being moved to any slot of a current array. According to a further embodiment, generating unit 410 may be configured to create a new user provision drive in response to a new drive and/or a user drive of further array being moved to a user slot of a current array. According to a further embodiment, generating unit 410 may be configured to re-initialize a system provision drive corresponding to a system slot in response to a new drive and/or a user drive of a further array being moved to a system slot of a current array.

According to a further embodiment, generating unit 410 may be configured to reclaim an original user provision drive and re-initialize a system provision drive corresponding to a system slot in response to an unbound user drive of a current array being moved to a system slot of a current array. According to a further embodiment, generating unit 410 may include a creating unit that may be configured to create a new user provision drive. According to a further embodiment, generating unit 410 may include a reclaiming unit that may be configured to reclaim an original user provision drive. According to a further embodiment, generating unit 410 may include a resetting unit that may be configured to re-initialize a system provision drive.

According to a further embodiment, connection establishing unit 420 may include a connecting establishing sub-unit that may be configured to establish a connection of a new drive, a connection of a user drive and a connection of a system drive to a corresponding user provision drive or system provision drive. According to a further embodiment, connection establishing unit 420 may further include a serial number matching unit that may be configured to create a connection from the provision drive to a physical drive based on a match of a serial number recorded on the provision drive and a serial number recorded on the physical drive.

Those skilled in the art should appreciate that steps of the method disclosed above may be implemented through universal computing devices, and they may be integrated on a single computing device or distributed on a network formed by a plurality of computing devices. Alternatively, they may be implemented by using program codes that may be executed by the computing device, so that they may be stored in the storage device and executed by the computing device, or they are respectively fabricated as respective integrated circuit modules, or a plurality of modules and steps in them are made be implemented by a single integrated circuit module. As such, the present disclosure is not limited to any specific hardware and software and the combinations thereof.

It should be appreciated that although the above detailed descriptions mention several devices or sub-devices of the apparatus, such division is only exemplary and non-compulsory. In fact, according to embodiments disclosed herein, features and functions of two or more devices described above may be embodied in one device. Instead, features and functions of one device described above may be further divided and embodied by a plurality of devices.

To conclude, embodiments of the present disclosure provide a method and apparatus for handling physical drive movement. According to an embodiment the method may include generating a provision drive for a physical drive that is moved; establishing a connection from the provision drive to the physical drive; and updating the provision drive via the connection according to the location information of the physical drive. Through the method of the above disclosure, a physical drive is allowed to move in a drive array so that all disks in a Raid group may be moved in a same array. This gives a user/administrator larger flexibility for an array configuration. Meanwhile, by using management policies for a physical drive movement as a portion of the method, it may be ensured that a physical drive may not be connected when it is moved incorrectly. This facilitates to avoid data loss during a drive movement, and meanwhile provides larger configuration flexibility to an administrator.

Described above are only optional embodiments of the present disclosure and are not intended to limit the present disclosure. Those skilled in the art appreciate that the present disclosure may include various modifications and variations. Any modifications, equivalent substitutions and improvements within the spirit and principle of the present disclosure should all fall within the protection scope of the present disclosure.

What is claimed is:

1. A method of managing physical drive movement, the method comprising:
generating a provision drive for a physical drive that is moved from a first location to a second location;
establishing a connection from the provision drive to the physical drive; and
updating the provision drive via the connection according to a location information of the physical drive.

2. The method according to claim 1, wherein the provision drive is a virtualization layer located between the physical drive and a disk group and is configured to record information of the connected physical drive.

3. The method according to claim 2, wherein the information of the connected physical drive comprises: a serial number of the physical drive and the location information of the physical drive; and according to the location information of the physical drive a slot at which the physical drive is located is categorized into a system slot and a user slot.

4. The method according to claim 1, wherein the physical drive comprises at least one of the following from the group consisting of:
   a new drive containing no data;
   a user drive, including a bound user drive containing user data or an unbound user drive containing no user data; and
   a system drive containing configuration and metadata of an array to which the system drive belongs.

5. The method according to claim 4, wherein
   the user drive is categorized into a user drive of a current array and a user drive of a further array; and
   the system drive is categorized into a system drive of a current array and a system drive of a further array.

6. The method according to claim 1, wherein generating a provision drive for a physical drive that is moved comprises at least one of:
   generating the provision drive in response to a user drive being moved to any slot of a current array; or
   generating the provision drive in response to a system drive of a current array being moved to an original system slot of the system drive.

7. The method according to claim 6, wherein generating the provision drive in response to a user drive being moved to any slot of a current array comprises:
   in response to a user drive of the current array being moved to any slot of the current array comprising at least one of:
      using an existing user provision drive; or
      creating a new user provision drive; or
      re-initializing a system provision drive corresponding to the system slot.

8. The method according to claim 6, wherein generating the provision drive in response to a user drive being moved to any slot of a current array comprises:
   in response to an unbound user drive of the current array to a system slot of the current array, reclaiming an original user provision drive and re-initializing a system provision drive corresponding to the system slot.

9. The method according to claim 1, wherein establishing a connection from the provision drive to the physical drive comprises:
   establishing a connection from the physical drive, wherein the physical drive is enabled to be a new drive, a user drive, or a system drive, to the provision drive, wherein the provision drive is enabled to be a user provision drive or a system provision drive.

10. The method according to claim 1, wherein establishing a connection from the provision drive to the physical drive comprises:
    establishing a connection from the provision drive to the physical drive based on a match of a serial number recorded on the provision drive with the serial number recorded on the physical drive.

11. A system, comprising;
    a data storage system including one or more physical drives;
    computer-executable logic operating in memory across one or more processors for managing physical drive movement, wherein the computer-executable logic is configured for the execution of:
    generating a provision drive for a physical drive that is moved from a first location to a second location;
    establishing a connection from the provision drive to the physical drive; and
    updating the provision drive via the connection according to a location information of the physical drive.

12. The system according to claim 11, wherein the provision drive is a virtualization layer located between the physical drive and a disk group and is configured to record information of the connected physical drive.

13. The system according to claim 12, wherein the information of the connected physical drive comprises: a serial number of the physical drive and the location information of the physical drive; and according to the location information of the physical drive a slot at which the physical drive is located is categorized into a system slot and a user slot.

14. The system according to claim 11, wherein the physical drive comprises at least one of the following from the group consisting of:
    a new drive containing no data;
    a user drive, including a bound user drive containing user data or an unbound user drive containing no user data; and
    a system drive containing configuration and metadata of an array to which the system drive belongs.

15. The system according to claim 14, wherein the user drive is categorized into a user drive of a current array and a user drive of a further array; and
    wherein the system drive is categorized into a system drive of a current array and a system drive of a further array.

16. The system according to claim 11, wherein generating a provision drive for a physical drive that is moved comprises at least one of:
    generating the provision drive in response to a user drive being moved to any slot of a current array; or
    generating the provision drive in response to a system drive of a current array being moved to an original system slot of the system drive.

17. The system according to claim 16, wherein generating the provision drive in response to a user drive being moved to any slot of a current array comprises:
    in response to a user drive of the current array being moved to any slot of the current array comprising at least one of:
       using an existing user provision drive; or
       creating a new user provision drive; or
       re-initializing a system provision drive corresponding to the system slot.

18. The system according to claim 16, wherein generating the provision drive in response to a user drive being moved to any slot of a current array comprises:
    in response to an unbound user drive of the current array to a system slot of the current array, reclaiming an original user provision drive and re-initializing a system provision drive corresponding to the system slot.

19. The system according to claim 11, wherein establishing a connection from the provision drive to the physical drive comprises:
    establishing a connection from the physical drive, wherein the physical drive is enabled to be a new drive, a user drive, or a system drive, to the provision drive, wherein the provision drive is enabled to be a user provision drive or a system provision drive.

20. A computer program product for handling physical drive movement, the computer program product being tangibly stored in a non-transitory computer-readable medium and comprising a machine-executable instruction, the machine-executable instruction being executed to enable the machine to:
   generating a provision drive for a physical drive that is moved from a first location to a second location;
   establish a connection from the provision drive to the physical drive; and
   update the provision drive via the connection according to a location information of the physical drive.

* * * * *